E. R. FELLOWS.
MACHINE FOR CUTTING CROWN GEARS.
APPLICATION FILED JUNE 4, 1914.

1,306,331.

Patented June 10, 1919.
6 SHEETS—SHEET 1.

Witnesses:
Inventor:
Edwin R. Fellows
by Wright, Brown, Quinby & May
Attorneys

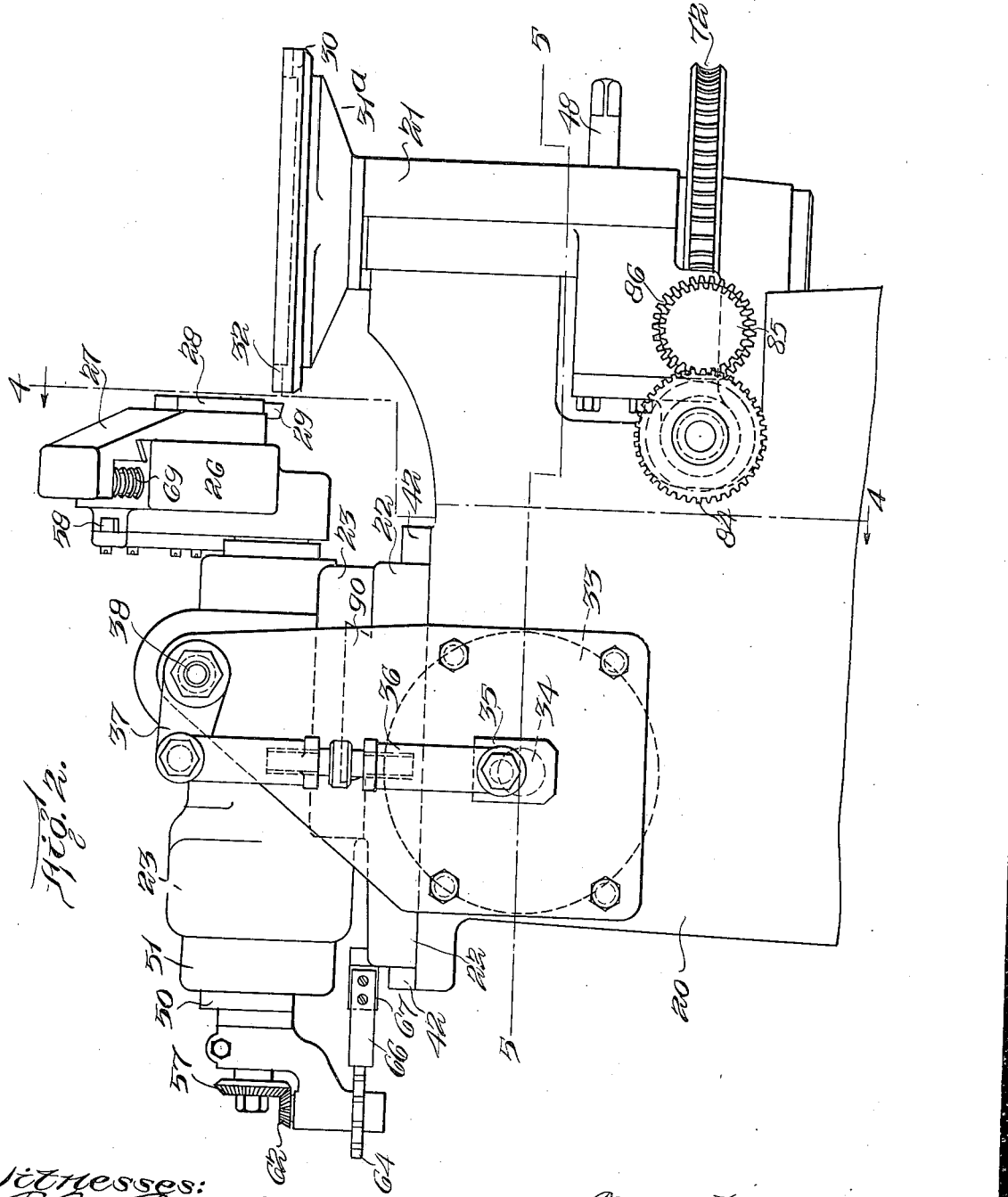

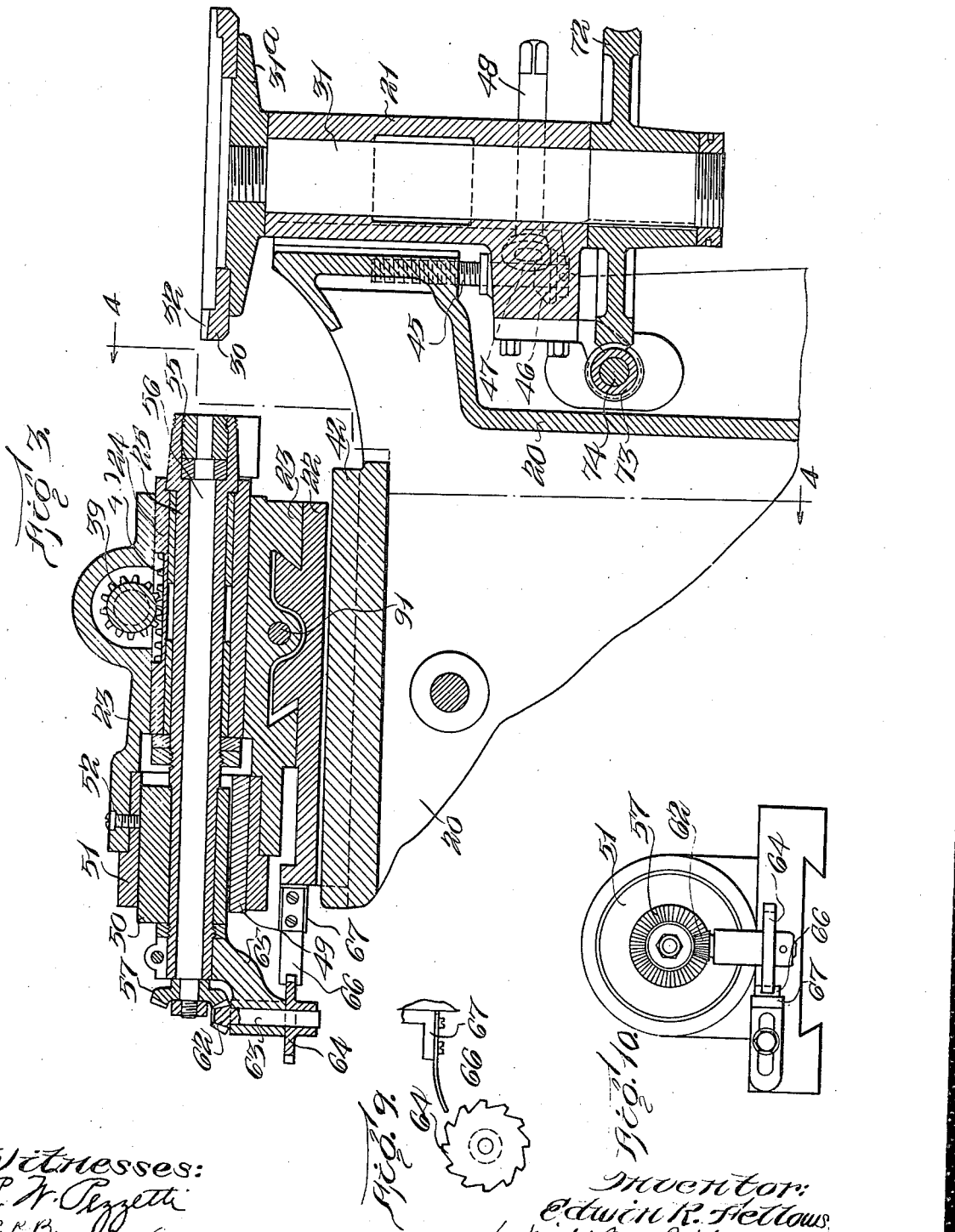

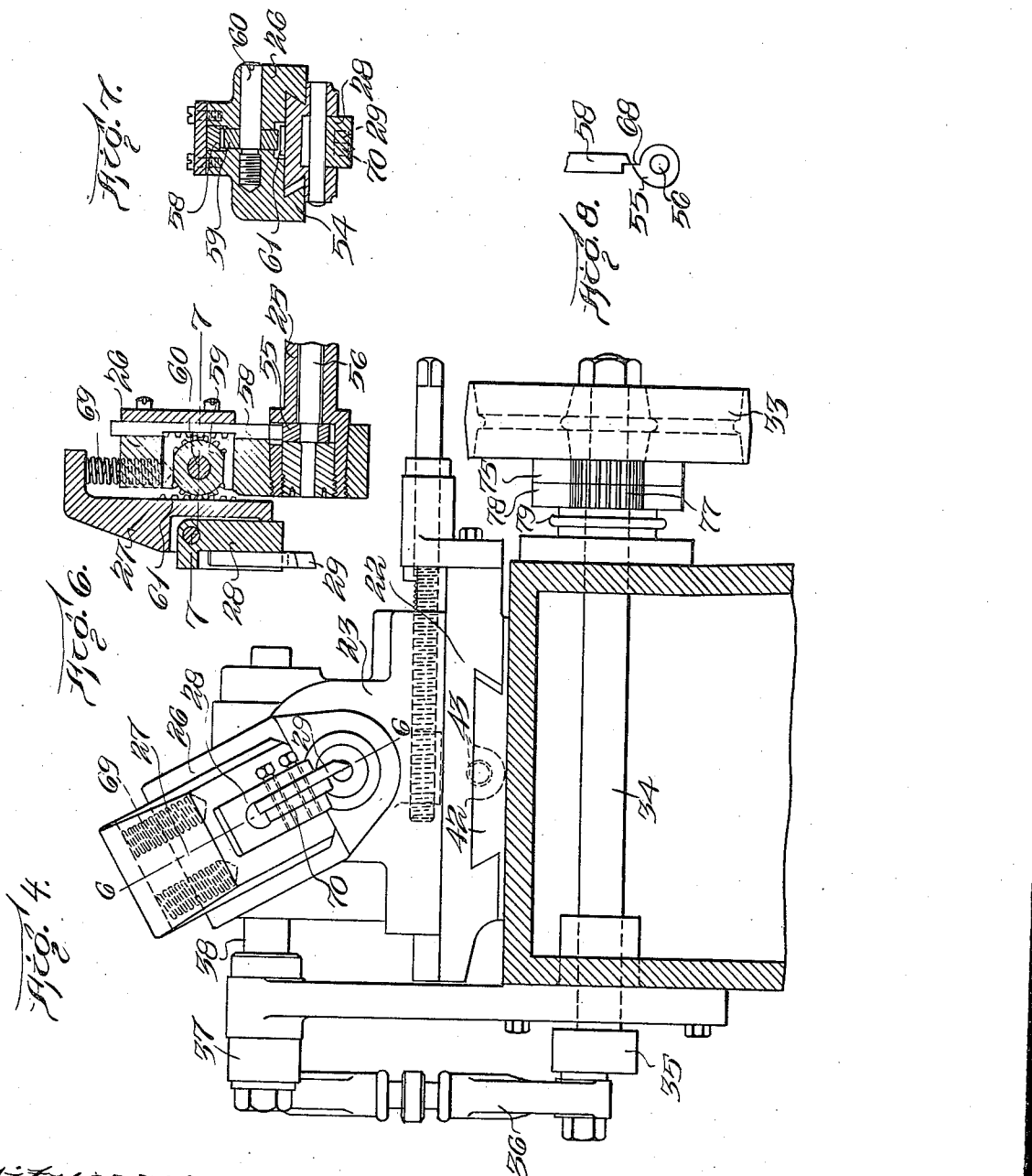

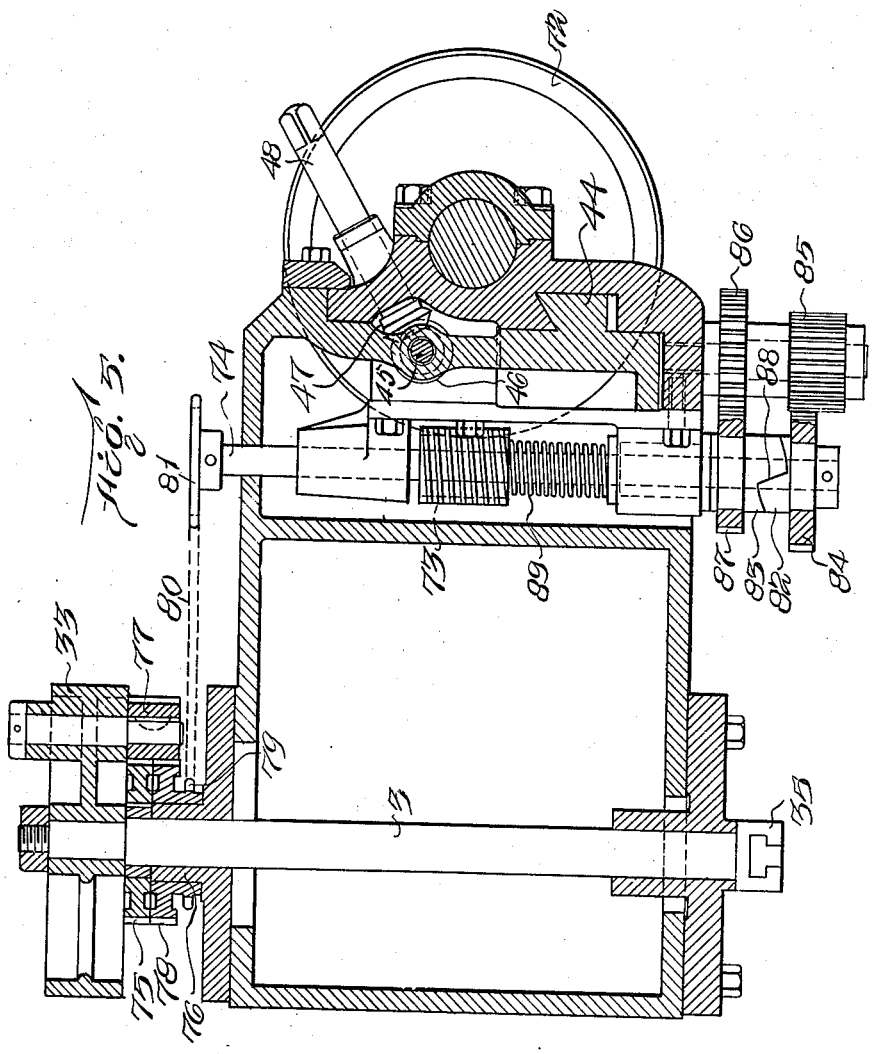

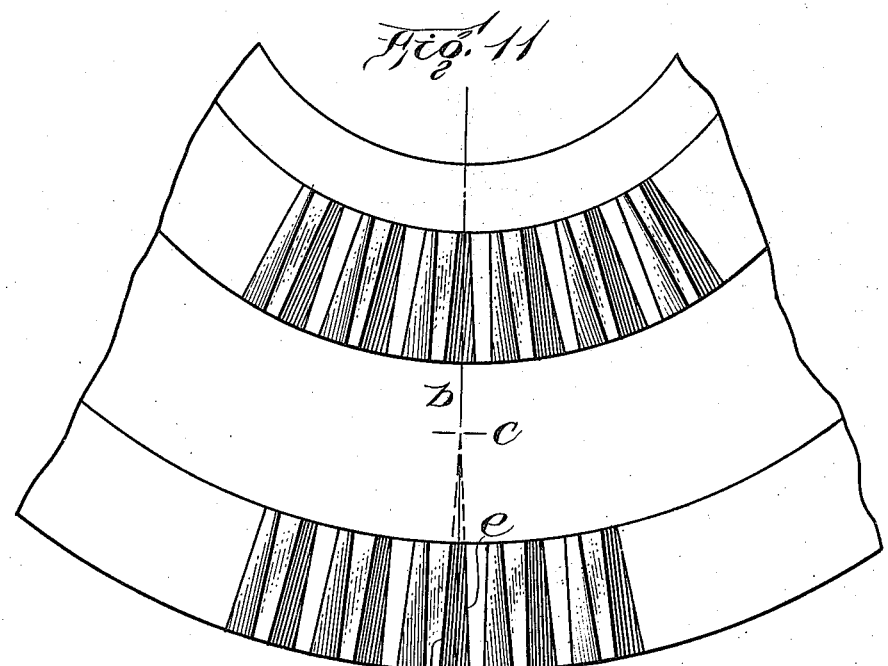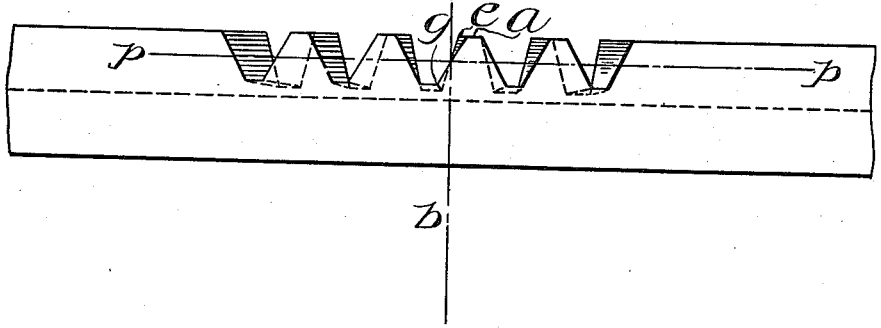

UNITED STATES PATENT OFFICE.

EDWIN R. FELLOWS, OF SPRINGFIELD, VERMONT.

MACHINE FOR CUTTING CROWN-GEARS.

1,306,331.   Specification of Letters Patent.   Patented June 10, 1919.

Application filed June 4, 1914. Serial No. 842,902.

*To all whom it may concern:*

Be it known that I, EDWIN R. FELLOWS, a citizen of the United States, and resident of Springfield, in the county of Windsor and State of Vermont, have invented certain new and useful Improvements in Machines for Cutting Crown-Gears, of which the following is a specification.

The object of the present invention is to provide a machine for cutting the teeth of crown gears, in which a cutter is caused to travel over the face of the tooth to be cut and is given a progressive change of inclination with respect to the face of the gear in traveling from one end of the tooth to the other. In a crown gear, as is well understood, the teeth are arranged in a plane or, in other words, the pitch surface of the gear is a plane, which is perpendicular to the axis of the gear, and the elements of the tooth faces are located in planes respectively parallel to one another and approximately perpendicular to the axis of the gear, being distinguished in this respect from a bevel gear of which the pitch surface is a cone and the elements of the tooth faces all diverge from a point in the axis of the gear. The face of the tooth of a crown gear, within certain limits, is substantially a warped plane of which the inclination varies progressively between the outer and inner limits of the tooth. The elements of the tooth face extending from the base to the top of the tooth, that is, perpendicularly to those elements which run parallel to the plane of the gear, are all approximately straight, within the limits indicated. Within such limits a crown gear may be considered as a rack, or rather an infinite number of racks of infinitesimal thickness placed side by side, and of which the several rack elements have increasing speed ratios according to their distances from the axis of the gear, as will more fully appear in the following detailed description.

The object of my invention is to provide a machine by which the faces of crown gear teeth may be cut by means of a cutter which is so restricted and guided as to follow the elements of such a warped plane as has been above described.

In the accompanying drawings wherein I have illustrated one embodiment of my invention in an operative machine, Figure 1 is a plan view of the machine with parts thereof shown in section.

Fig. 2 is a side elevation of the machine.

Fig. 3 is a vertical longitudinal section of the machine through the axes of the tool holder and of the work holder.

Fig. 4 is a vertical cross section on line 4—4 of Figs. 2 and 3 showing the parts at the left of such line in elevation.

Fig. 5 is a horizontal section on line 5—5 of Fig. 2.

Figure 1:
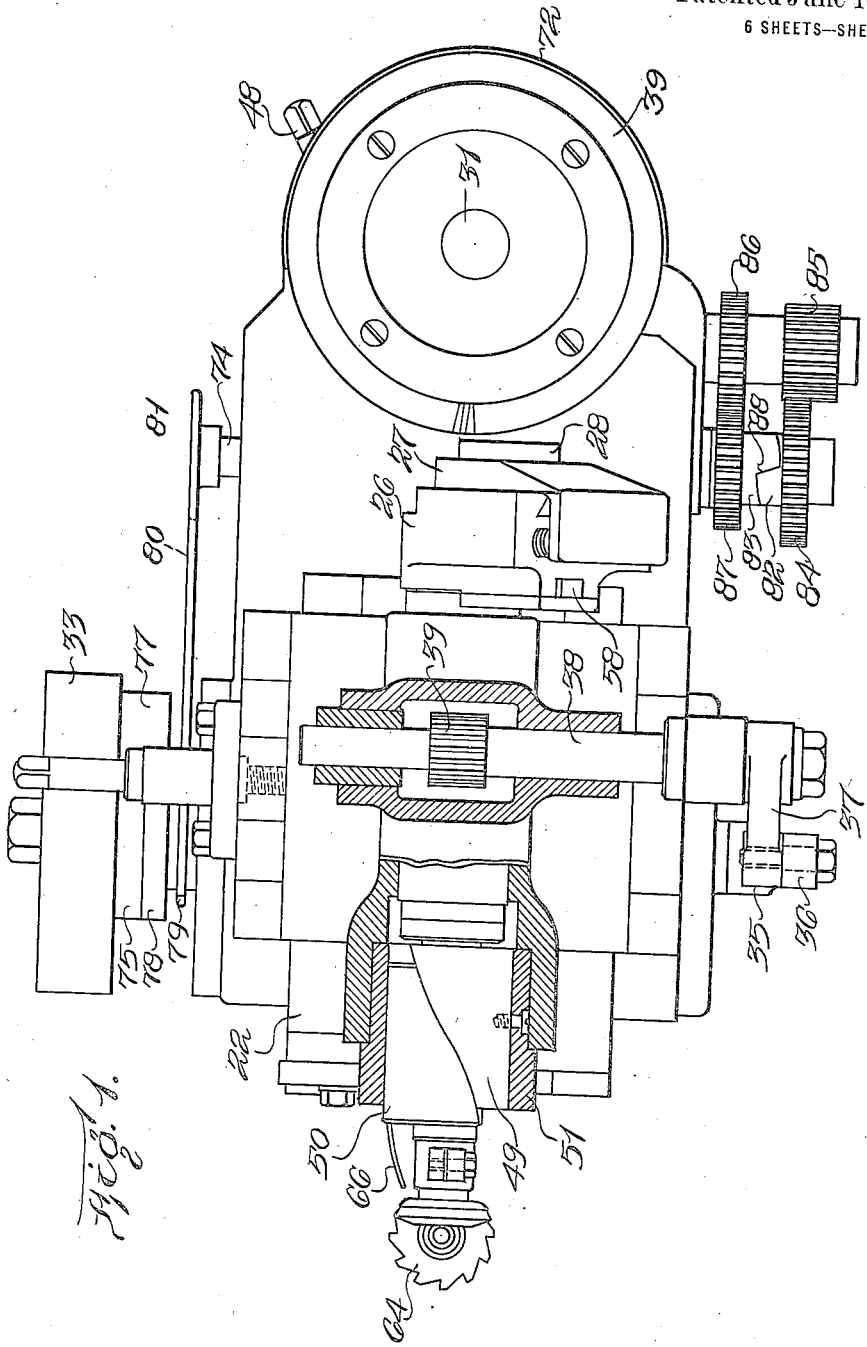

Figs. 6 and 7 are sectional views of the tool head taken on lines 6—6 of Fig. 4 and 7—7 of Fig. 6, respectively.

Fig. 8 is a detail view of a part of the tool feeding mechanism.

Fig. 9 is a detail view in plan of another part of the tool feeding mechanism.

Fig. 10 is an elevation as seen from the left hand end of Fig. 1 of the tool carrying slide and the tool feeding actuator shown in Fig. 9.

Figs. 11 and 12 are respectively a plan and an elevation of part of a crown gear, illustrating the principle according to which the present machine operates.

The same reference characters indicate the same parts in all the figures.

Referring first to Figs. 11 and 12, $a$ represents one of the teeth of a crown gear. The line $b$—$b$ represents a plane passing through the axis of the gear and through the median line of one of the faces of the tooth $a$. The line $c$—$d$ represents the line of the upper edge $e$ of this face of the tooth, while the line $c$—$f$ represents the extension of the bottom edge $g$ of such face.

The principle according to which this machine operates may best be understood by considering the toothed portion of the gear as being made up of a number of racks of infinitesimal thickness placed side by side. The fact that these imaginary racks are bent around a center does not alter their character of being essentially racks, since their teeth are all in the same plane, and indeed, within the plane of action between the gear and the mating pinion, the curvature of the imaginary racks is so slight that it may be ignored, and such racks considered as being straight, within the limits of such plane of action. It may be considered that in the rotation of the gear the imaginary racks travel at varying speeds proportional to their distances from the axis of the gear. The teeth of the crown gear are adapted to mesh with a spur pinion, the teeth of which have the same pitch, width and formation from end to end axially of the pinion. Each of the imaginary racks must have its teeth conjugate to the same teeth of the pinion. If it be assumed that the innermost rack has the same linear speed of travel as the pitch circle of the pinion, then the imaginary racks more remote from the center of the gear have greater linear speeds, and their teeth must be spaced more widely apart and have faces of different inclinations from the teeth of the inner racks. I have found that the teeth of a theoretically correct crown gear approximate very closely to teeth formed as above described and that the elements of the tooth faces in the direction from the top to the bottom of the tooth are so nearly straight that it is practically impossible to discern any curvature. It is evident, therefore, from the foregoing discussion that a crown gear made up of excessively narrow rack elements arranged side by side and each being capable of moving at a linear speed proportional to its distance from the axis of the gear will mesh with a spur pinion, and the adjoining faces of the corresponding teeth of such imaginary thin racks will collectively form warped planes which are steepest, with respect to an axial plane through the face of the tooth, at the extremity of the tooth next to the axis of the gear and gradually decrease in steepness with respect to such plane toward the outer extremity of the tooth. A crown gear in which the tooth faces are in such warped planes having their elements straight both transversely and longitudinally of the gear answers all practical requirements for gearing.

The machine which forms the subject of the present invention is provided with a cutter which is given movements both longitudinally of the tooth and rotatively about an axis represented by the line $b$—$b$ in Fig. 11 so as to follow the elements of such a warped plane; and the work piece is indexed after the face of each tooth has been cut so as to present an uncut tooth in the cutting position and to hold such tooth stationary while the cutting is carried out.

Referring to the drawings of the machine, 20 represents the base or pedestal on which there is mounted a vertical slide 21 at one end carrying the work, and a horizontal bed 22. The bed 22 supports a carriage 23 whereon is mounted the tool carrying slide 24, the latter containing a tool spindle 25 whereon is mounted the cutter head or tool holder 26. The cutter head 26 supports a slide 27 on which is pivoted a clapper 28, carrying the cutter 29. For the purposes of this description, the cutter head 26 may be considered as a linearly movable and rotatable cutter carrier.

The work piece 30 is mounted upon a spindle 31 which is held rotatably in the slide 21. The tool holding bed, carriage, and slide are so arranged that the slide 24 and the tool may travel in a line perpendicular to the axis of the work piece and of the work spindle 31 across that portion 32 of the work in which the teeth are cut.

The mechanism for reciprocating the slide 24 and cutter head comprises a driving pulley 33 on a shaft 34 which carries a crank 35. Such crank is pivoted to a link or connecting rod 36 and such link is pivoted to a crank arm 37 on a shaft 38 which is mounted in bearings in the carriage 23. Shaft 38 is provided with a pinion 39 meshing with a rack 40 on the tool-carrying slide 41. It will be evident that this mechanism will reciprocate the cutter head carrying the cutter 29 toward and away from the axis of the gear blank. The bed 22 is adjustable horizontally in the line of motion of the cutter so as to locate the zone of action of the cutter properly for blanks of different diameters. To permit of this adjustment the bed 22 is arranged on a horizontal guideway 42 (shown in Fig. 4) extending in the direction of reciprocation of the tool. A screw 43 may be used for accomplishing this adjustment.

The slide 21 carrying the work holding spindle is adjustable vertically on a guideway 44 (Fig. 5) and is adjusted by means of a screw 45, bevel gears 46 and 47, and a stud shaft 48, adapted to be turned by a wrench, so as to locate the work in the proper horizontal plane.

A partial rotation is given to the cutter head or carrier and the cutter during its reciprocation by means of a stationary cam element 49 engaged with a cam element 50 secured to the cutter carrying spindle 25. The mating surfaces of the cams 49 and 50 are carried around the axis of the tool spindle on such an inclination as to cause the tool to progressively and uniformly change its inclination from that of the outer end of the tooth face to that of the inner end of such face during its traverse across the part 32 of the blank in which the tooth is formed. It should be stated that the tool spindle 25 is rotatable in the slide 24, as shown in Fig. 3. The vertical adjustment of the work spindle previously described permits of the work being located where the median line of the tooth face acted on is in the axis of rotation of the tool spindle 25.

Opposite directions of rotation of the tool are necessary for cutting the opposite faces of the same tooth, wherefore cams 49 and 50 must be replaceable by similar cams having their cam faces oppositely inclined. The cam 49 is secured to a sleeve 51 (Fig. 1) which is mounted detachably in the carriage 23 and is secured by a screw 52 (Fig. 2). The cam 50 is detachably secured upon the tool spindle 25, whereby cams of the opposite inclination as suggested may be substituted.

In cutting gears of certain materials, such as cast iron, it may be possible to use a broad faced cutting tool which acts upon the entire face of the tooth at once, but for other materials, for example high carbon steel, it is impractical to employ such a tool operating in this manner, and better results can be secured by having the tool act on only a narrow portion of the face at each cut, making a number of cuts to complete the entire face. To permit of the last suggested mode of operation I have mounted the tool with provision for being fed transversely of its line of operation on the head 26. The slide 27 is mounted in a guideway 54 in the head, and is adjusted by mechanism consisting of a cam 55 on a shaft 56 which extends longitudinally through the interior of the spindle 25, and has a bevel gear 57 on its outer end. Cam 55 bears on the end of a rack 58, which is mounted slidingly in the tool head 26 and meshes with a pinion 59 which is rotatably mounted on a stud 60 in the head. Pinion 59 meshes also with rack teeth 61 formed upon the slide 27. The pinion 57 on the outer end of the shaft 56 meshes with a complemental pinion 62 on a stud shaft 63 which carries a ratchet wheel 64. Shaft 63 is mounted in a bearing in a bracket 65 which is secured to the tool spindle and moves therewith. As the tool spindle nears the end of its stroke in one direction a tooth of the ratchet 64 is brought into contact with a pawl 66 which is secured to a bracket 67 fixed to the bed 22 and the ratchet wheel is turned through a small angle. This rotary movement of the ratchet is transmitted through the shaft 56 to the cam 55, which preferably has a spiral cam face terminating in an abrupt shoulder 68, as shown in Fig. 8. The cam progressively raises rack 58, which progressively lowers the tool slide 27, until the shoulder 68 of the cam passes from under the rack at the conclusion of the feed, whereupon the tool is returned to its first position by springs 69, which are so arranged between parts of the tool head and slide as to tend constantly to retract the tool.

The pivotally mounted clapper 28 in which the tool is held is provided in order to relieve the pressure of the tool on the work in its return stroke. It will be noted that a recess is provided for the tool in the clapper, which recess is twice the width of the tool shank, and the tool is secured in one side of the recess by a shim 70. This manner of mounting the tool permits the tool here shown to be replaced by one located in the opposite side of the recess and turned about so as to act on the opposite face of the tooth from that on which the cutter 29 acts.

The mechanism for indexing the work after completion of each tooth is as follows, reference being had particularly to Fig. 5. An index worm wheel 72 is secured to the work spindle and is in mesh with a worm 73, which is secured to a worm shaft 74. This shaft is driven by the pulley 33 through differential gearing consisting of a gear 75 held stationary upon a boss 76 at the side of the machine base, a planetary pinion 77 carried by the driving pulley 33, and a gear 78 loosely rotatable on the boss 76. A sprocket 79 is fixed on the hub of gear 78 and drives a chain 80, which passes around a sprocket 81 on the worm shaft 74, thereby giving a constant rotation at reduced speed to the worm. The worm is prevented from turning the index wheel except at the times when indexing is required, by means of complemental cams 82 and 83, the former being pinned to the worm shaft and the latter being free to rotate about the shaft, its rotation being controlled by a gear train consisting of a gear 84 fast to the worm shaft, connected gears 85 and 86 rotatable on a parallel stud shaft and of which 85 meshes with 84, and a gear 87 secured to the cam 83 meshing with gear 86. The mating faces of the cams 82 and 83 are formed approximately as a helix making substantially a complete rotation and the opposite ends of the helix being connected by a surface 88 which is approximately axial. The value of the gear train is proportioned according to the pitch of the worm so as to move the worm endwise without turning the index wheel. That is, if it is desired to index the work through a distance of one-half an inch and the worm has a pitch of one quarter inch, the worm would be rotated twice in the time required to cut one tooth, and the gear train, 84, 85, 86, and 87 would be proportioned to rotate the cam 83 relatively to the cam 82 once, the extreme offset of the cams being then one-half inch. The cams move the shaft and worm endwise against the pressure of a spring 89 which is compressed, and when the ends of the complemental surfaces on the cams 82 and 83 pass one another, after the completion of a tooth, the spring 89 returns the worm to its first position and so rotates the index wheel through the desired distance. It is to be understood that the figures above given are for example only to assist in explaining the character of the motion given and are not intended to limit the machine in anywise. It is a part of my contemplation to substitute index wheels, worms, cams, and gears for those just described having any other values necessary to enable crown gears of any size with any spacing of teeth to be cut. The carriage 23 heretofore mentioned is adjustable laterally on a transverse guideway 90 on the bed 22 for two purposes; first, to secure an accurate adjustment of the tool for alinement, and second to set the tool over to one side or another of an axial plane of the work, if desired for cutting special forms of gear in which the teeth are other than radial. The adjustment of the carriage is acomplished by a screw shaft 91, which may be of any ordinary or other desired character suitable for an adjustment of this sort.

The machine which I have just described operates upon the principle of a planer, which when operating upon some kinds of material, is required to make a number of parallel cuts in completing one tooth. However I do not limit my invention to a machine including a planing cutter, or exclude my right to protection for any other type of cutter, and suitable mechanism for operating the same, adapted to secure the results hereinbefore described.

I desire to note that in describing certain parts and adjustments of the machine as vertical and other parts and adjustments as horizontal, I have not intended to limit the invention to a machine arranged as here shown. The terms "vertical" and "horizontal" as used in this specification are relative and not absolute. It happens that in the design of the machine here shown the cutter travels horizontally, but it would be no departure from the invention to arrange the parts so that the travel of the cutter would be vertical or at any intermediate inclination.

It will be seen from Fig. 4 that the cutting edge of the cutter is located in a plane passing through the axis about which the cutter head rotates, and that the feed of the cutter takes place in that plane; also that the cutting edge of the cutter intersects such axis. Thus the cutter is turned about an axis lying in the plane which includes both the edge of the cutter and the line of feed of such edge. The adjustment between the cutter and work is so made that said axis coincides with the median line of the face of the tooth upon which the cutter is acting, such median line being that indicated in connection with Figs. 11 and 12, and being the intersection of the plane *b—b* with the pitch plane *p—p* shown in Fig. 12. By virtue of this relation the progressive strokes of the cutter, when such cutter acts on only a narrow part of the tooth face at one time, cause the entire tooth face to be cut as a warped plane or helicoidal surface of the necessary character. The axis of rotation of the tool might be in another element of the tooth face than the median line thereof, without departing from the spirit of the invention. As the machine is designed and organized to cut the teeth of crown gears, all the teeth of which are in a plane perpendicular to the axis, the work holder is arranged to support the work piece with its pitch plane in coincidence with the axial line in which the cutter travels and about which it turns; and with the axis of the work piece perpendicular to a plane which includes said axial line. In the particular design herein illustrated and described, the plane last referred to is horizontal, and also the axes of the work piece and of the cutter are perpendicular to one another in the same vertical plane; but these last conditions may be departed from without departure from the general condition, essential to the cutting of crown gears, that the axis of the work piece be perpendicular to a plane passing through the axis about which the cutter turns and in the line of which the cutter travels; or conversely, that the last-named axis is perpendicular to a plane including the axis of the work piece.

What I claim and desire to secure by Letters Patent is:

1. A machine for cutting crown gears comprising holding means adapted to support a crown gear blank with its tooth bearing portion in a given plane and its axis perpendicular to a plane which includes the after-mentioned axis, a cutter carrier mounted to travel in a path parallel to said plane and also to turn about an axis in the pitch plane of the gear blank so held, a cutting tool mounted on said carrier with its cutting edge in a line intersecting said axis, and means for simultaneously moving said carrier and turning it.

2. A machine for cutting crown gears comprising a gear blank holder, a carrier mounted and arranged to travel in a straight line and also to turn about an axis parallel to said line, a cutting tool mounted in said carrier with its cutting edge in a line intersecting said axis, means for moving said carrier in its appointed path, and means for causing the carrier to turn progressively and uniformly about its axis.

3. A machine for cutting crown gears comprising in combination with a holder for a gear blank, a cutting tool, means for causing said tool to travel in a line parallel to the plane in which the teeth of the crown gear are located and perpendicular to a plane including the axis of the gear, and means for causing said tool to turn simultaneously during its travel about an axis lying in the face of a tooth of the gear whereby to cut such face in the form of a warped plane.

4. A machine for cutting crown gears comprising a cutter, means for causing the said cutter to travel in a straight line, means for causing the cutter to turn simultaneously about an axis extending in the direction of its travel and occupying the same plane with the cutting edge of the tool, and means for holding a gear blank stationary with the median line of that portion thereof which forms the face of a tooth in alinement with said axis, and with its own axis perpendicular to said axis.

5. A machine for cutting crown gears comprising a work holder adapted to hold a gear blank in stationary position, a cutter carrier, a cutter mounted in said carrier, means for so moving said carrier and the cutter as to cause the cutter to travel along the side of a tooth of the gear blank, and means for simultaneously turning the cutter about an axis lying in the face of the tooth and both approximately parallel to the plane and perpendicular to the axis of the gear.

6. In a gear cutting machine, a cutter head mounted with provision for movement in a predetermined line and also rotatable about an axis extending in the direction of its movement, a cutter carried by said head and adjustable in a direction transverse to the motion of the head, means for so moving the head and turning it about such axis, and means for adjusting the cutter upon the head transversely of such line of movement.

7. In a gear cutting machine the combination of a cutter carriage mounted with provision for movement in a straight line and also for oscillation about an axis extending in the direction of its movement, mechanism for simultaneously moving said carrier in such line and turning it about such axis, and a cutter mounted upon said carrier having its cutting edge in a line intersecting said axis of oscillation and being adjustable longitudinally of such edge.

8. In a gear cutting machine a reciprocating cutter carriage, a reciprocative and rotatably mounted cutter head, a cutter holding slide on said head adjustable in a line intersecting the axis of rotation of the latter, automatic mechanism for simultaneously reciprocating said slide and turning it about its axis, and automatic means for periodically shifting said slide in its path of adjustment.

9. In a gear cutting machine a reciprocative and rotatable cutter carrying head, means for simultaneously reciprocating and turning the same, a cutter holder adjustable on said head in a line intersecting the axis of rotation of the latter, gearing carried by said head engaging said slide for feeding the same progressively in its line of adjustment, and means actuated by the translative movement of said head for driving said gearing.

10. In a gear cutting machine a cutter head mounted to reciprocate and rotate at the same time, means for so reciprocating and rotating the same, a cutter holder movably mounted on said head, gearing engaged with said holder for moving the same, a cam rotatably mounted upon said head adapted to drive said gearing, and means operated during the travel of the head for driving said cam.

11. In a gear cutting machine, a carriage, a tubular shaft having a bearing in said carriage wherein it is movable both endwise and rotatively, a head mounted on said shaft, a slide mounted on said head and being adjustable in a line crossing the axis of said shaft, a cutter mounted on said slide, a rack connected to the slide, a pinion mounted in the head meshing with said rack, a second rack meshing with said pinion and movably mounted upon the head, a shaft contained rotatably within said tubular shaft, a cam on said inner shaft arranged to act on said movable rack, mechanism for reciprocating and rotating said tubular shaft, and means for turning said inner shaft step by step to feed the cutter slide.

12. In a gear cutting machine an axially and rotatably mounted cutter carrying head, means for moving said head axially, complemental cam elements, one of which is secured to said head for causing the latter to be turned uniformly as it is axially moved uniformly, and a cutting tool carried by said head with its cutting edge in a line intersecting the rotative axis of the head.

13. In a gear cutting machine, a rotatable work support, an index wheel connected with said support, a constantly rotating worm meshing with said index wheel, and mechanism for moving said worm endwise against yielding resistance during its rotation at such a rate that the index wheel remains stationary and said means being operable periodically to permit return of the worm, without rotating to its first position, whereby to turn the index wheel and work through the predetermined angular distance.

14. In a gear cutting machine, a work holder, an index wheel connected to said holder, an indexing worm meshing with said wheel, means for rotating said worm, a cam having engagement with said worm and operative to displace the same axially when rotated, gearing for rotating said cam at a rate in proportion to the pitch of the worm, and a yielding resistance opposing axial movement of the worm and tending to return the same after displacement thereof, said cam being formed to permit return of the worm to first position at a predetermined time, whereby to give indexing movement to the wheel and work through the required distance.

15. In a machine for cutting crown gears, means for holding a crown gear blank, a cutter carrier movable in a straight line substantially parallel to the plane in which such blank is held, and also rotatable about an axis extending in the direction of its movement, a cutter carried by said carrier with its cutting edge in a line intersecting said axis, means for so moving the carrier, and a carriage on which the carrier is mounted, said carriage being adjustable in directions transverse to the line of movement of the cutter carrier.

16. In a machine for cutting crown gears, a cutter, a carrier for said cutter movable in a straight line and also adapted to turn about an axis extending in the direction of its movement, means for so moving and turning the carrier, a carriage in which the carrier is mounted and a bed on which said carriage is mounted, said bed and carriage being adjustable in directions respectively transverse to one another, whereby the cutter may be shifted in relation to the work.

17. A machine for cutting crown gears comprising in combination with a work holder adapted to hold a crown gear blank, a cutter carrier movable approximately parallel to the plane of said gear and also rotatable about an axis extending in the direction of its movement, a carriage by which said cutter carrier is mounted and upon which the said carrier has its described movements of translations and rotation, a bed on which said carriage is mounted with capacity for adjustment, and a support on which said bed is mounted with capacity for adjustment in directions transverse to the adjustments of the carriage, one of said adjustments being toward and away from the work holder to accommodate gear blanks of different sizes, and the other being transverse with respect to the axis of the blank to determine the inclinations of the teeth cut therein with respect to the radii of the gear.

18. In a machine for cutting crown gears, a work holder adapted to support a crown gear blank, a cutter carrier having a cutting tool, a carriage on which said carrier is mounted and a bed on which the carriage is mounted, the bed being adjustable toward and away from the work holder, the carriage being adjustable on the bed transversely, and the cutter carrier being movable back and forth toward and away from the work holder on the carriage.

19. In a gear cutting machine, an endwise movable cutter carrier, said carrier being also arranged to turn about an axis extending in the direction of such movement, a cutter mounted on said carrier and adjustable transversely to the direction of movement thereof, and mechanism arranged for operation in the travel of the carrier for periodically feeding the cutter.

20. In a machine for cutting crown gears, a work holder adapted to support a crown gear blank, a cutter carrier movable toward and away from the work holder parallel to the plane of such blank and being also arranged to turn about an axis of which the prolongation lies within the limits of a face of the tooth being cut, a cutting tool mounted on said carrier with its cutting edge in a line intersecting said axis and being adjustable along such line, and automatic means for periodically feeding the cutting tool in said line of adjustment.

21. A crown gear cutting machine comprising a cutter carrier which is movable rotatably and also translatively longitudinally of its axis of rotation, a cutting tool mounted on said carrier with its edge in a line crossing said axis, and work holding means constructed and arranged to hold a crown gear blank with its axis perpendicular, and the plane of its tooth bearing part parallel, to said axis.

In testimony whereof I have affixed my signature, in presence of two witnesses.

EDWIN R. FELLOWS.

Witnesses:
 RUSSELL M. FELLOWS,
 E. W. MILLER.